United States Patent [19]

West, Jr. et al.

[11] 4,261,837
[45] Apr. 14, 1981

[54] METHOD AND APPARATUS FOR PURIFYING WATER

[76] Inventors: Frank L. West, Jr., 650 Hillside Ct., Barrington, Ill. 60010; Frank L. West, Sr., 2194 Briarcliff Rd., Atlanta, Ga. 30329

[21] Appl. No.: 114,356

[22] Filed: Jan. 22, 1980

Related U.S. Application Data

[63] Continuation of Ser. No. 806,606, Jun. 15, 1977, abandoned.

[51] Int. Cl.³ .............................................. C02B 3/06
[52] U.S. Cl. ................................... 210/754; 210/101; 210/205; 210/254
[58] Field of Search ............... 210/62, 101, 206, 205, 210/254

[56] References Cited

U.S. PATENT DOCUMENTS

| | | | |
|---|---|---|---|
| 674,153 | 5/1901 | Bachman | 210/101 |
| 1,995,639 | 3/1935 | Henderson | 210/62 |
| 2,370,772 | 3/1945 | Bowers | 210/206 |
| 3,412,021 | 11/1968 | Paterson | 210/62 |
| 3,701,728 | 10/1972 | Addleman | 210/62 R |
| 3,928,197 | 12/1975 | Horan et al. | 210/62 |
| 3,975,247 | 8/1976 | Stralser | 210/62 |

*Primary Examiner*—John Adee
*Attorney, Agent, or Firm*—James J. Conlon

[57] ABSTRACT

An apparatus and method for purifying water by the addition of a halogen such as iodine in a metered amount. Incoming water is divided into two branches, a first branch where the halogen is added and a second branch leading to a mixing tank where the halogen-water solution from the first branch is joined and turbulently mixed together. The fluid then passes into a main kill tank where the halogen-water mixture is held for at least one minute to allow the halogen to kill bacteria. The water-halogen mixture is then passed into a carbon-mesh filter to remove the halogen and any suspended or dissolved impurities to provide a purified, fresh tasting water.

5 Claims, 1 Drawing Figure

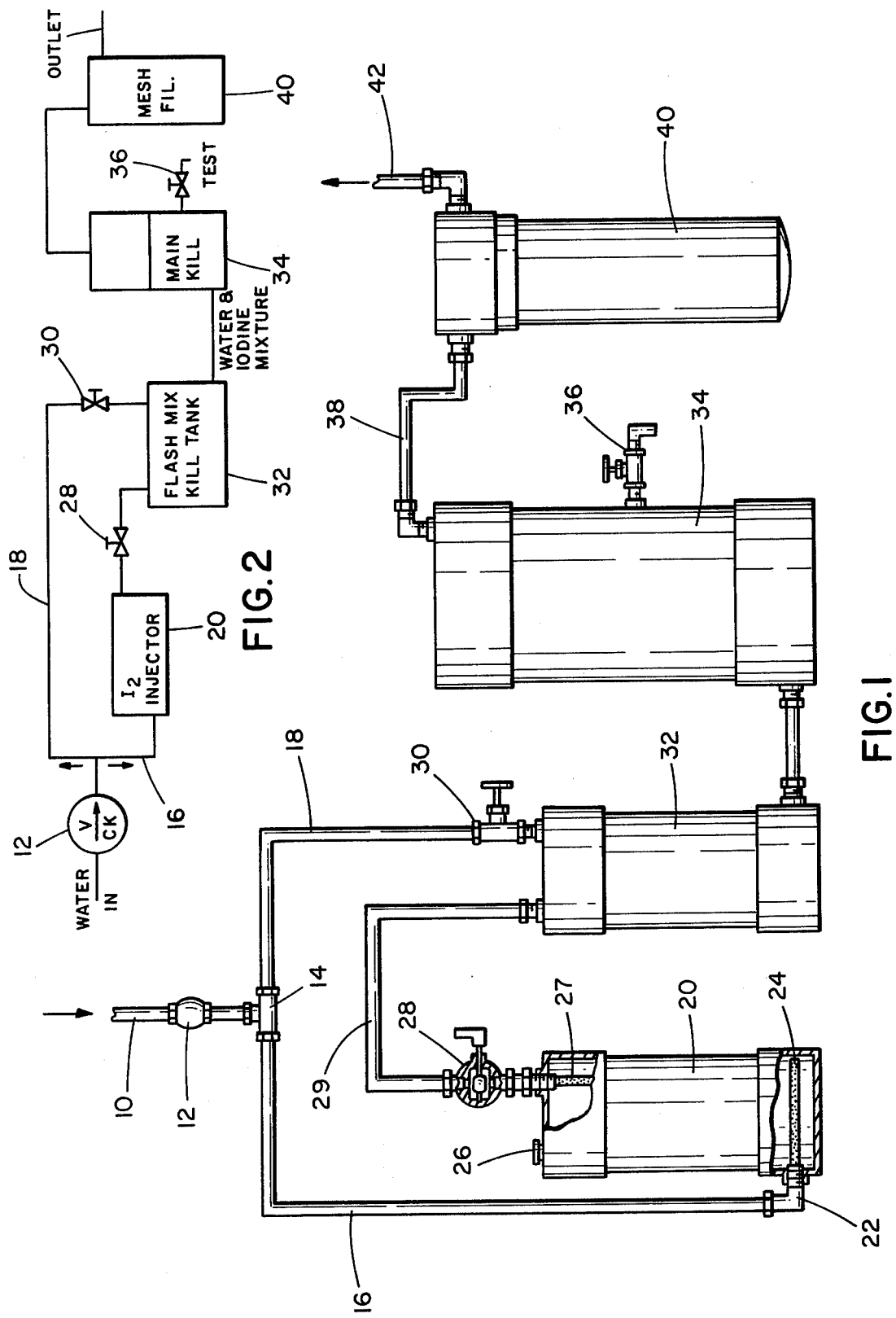

METHOD AND APPARATUS FOR PURIFYING WATER

This is a continuation of application Ser. No. 806,606, filed June 15, 1977, now abandoned.

BACKGROUND OF THE INVENTION (1) The Field of the Invention

This invention pertains to a pollution control system used for purifying water in commercial, domestic, industrial, recreational applications or the like.

(2) Description of the Prior Art

The prior art devices that have used a halogen such as chlorine, bromine or iodine have not met with widespread acceptance. Current systems and apparatus such as that disclosed by Horan et al., U.S. Pat. No. 3,928,197 and the Henderson U.S. Pat. No. 1,995,639 disclose arrangements for adding halogens to a water supply for purification purposes. However, these systems provide a water-halogen mixture to the consumer which is often times unpleasant to taste because of the conspicious presence of the halogen, particularly chlorine which is used widely throughout the United States.

The Appleman disclosure U.S. Pat. No. 3,701,728 (1972) discloses an electrolysis method employing a filter to reduce the halogen content in the treated water. This device has not met with widespread acceptance because of the need to provide both electricity at the location of water treatment and the extensive costs involved in an electrolysis device which makes it undesirable not only in the United States but overseas where frequently electricity is not available in water polluted areas.

SUMMARY OF THE INVENTION

This invention pertains to a method and apparatus for purifying water which utilize system water pressure to distribute a purifying agent and does not require the use of outside pressure or electrical power.

In operation, water is passed through a check valve to distribute partially through an iodine salt tank and from there into a mixing-kill tank where the halogen treated water is joined with supply water. The water and iodine solution is then turbulently mixed in the kill tank to insure proper exposure of the iodine to the inlet water. This water-iodine mixture is then passed into a main kill tank where it is stored for at least one minute to insure harmful bacteria kill far below the U.S. drinking water standards. From the main kill tank, the solution is passed through a mesh and carbon filter to eliminate any taste of the halogen such as iodine and to remove all other impurities, taste and odor from the water.

It is the purpose of this invention to provide a highly portable water pollution treatment system that does not require the use of external power and insures complete purification of treated water.

It is another object of this invention to provide a water purification system wherein the treating halogen, such as iodine, is metered into a water supply in direct proportion to the pressure and flow of the incoming water supply.

Another object is to remove the halogen prior to consumption to provide a fresh, natural tasting water.

These and other objects of the invention will become apparent to those having skill in the art with reference to the following drawings, description and appended claims.

BRIEF DESCRIPTION OF THE DRAWINGS

FIG. 1 is an illustration of the arrangement of the system components; and,

FIG. 2 is a schematic flow diagram of the system.

DETAILED DESCRIPTION

Referring now to the drawings and in particular to FIG. 1, there is shown the components of the system for pollution control of a water supply. In particular, inlet water enters the system through a conduit or pipe 10. Check valve 12 is located in the inlet line to allow flow of water into the system and prevent water from backflowing from the system once it enters. After leaving the check valve 12, water is diverted through a tee 14 and proceeds into first and second branches 16 and 18, respectively. A portion of incoming water passes through the first branch 16, through the connector elbow 22 and into an injector 20. Injector 20 contains a halogen salt or crystals, iodine is recommended, which are introduced into tank 20 through the filling tube 26 that is located conveniently at the top of the tank. Water enters from the elbow 22 through a jet inlet pipe 24 that extends across the bottom of the injector 20 and includes a number of small openings that are used to distribute incoming water evenly and in a turbulent fashion around the iodine crystals that are contained within the tank 20. Iodine, such as those identified as U.S.P. resublimed crystals may be used.

The iodine treated water passes from the iodine injector tank 20 through a safety screen 27. Safety screen 27 prevents the undissolved iodine crystals from leaving injector tank 20. Flow control valve 28 is located to regulate the flow of the iodine-water solution from the injector tank 20. Thus, in setting up the system, a metered amount of iodine and water flows from the injector tank 20 and is controlled by the flow control valve 28.

As mentioned earlier, incoming water to be treated is diverted through the tee 14 into the second branch 18 and flow there through may be controlled by the inlet valve 30. A flash mix-kill tank 32 receives the untreated water through valve 30 and an iodine-water solution through conduit 29. Incoming fluid entering the flash mix-kill tank 32 is mixed together at a relatively high velocity to produce turbulent flow that insures a complete mixture of untreated water with the iodine-water solution. From the flash mix-kill tank 32 the treated solution passes into a main kill tank 34 where it is held for at least one minute to insure safe, potable water at the point where it is consumed. The main kill tank 34 is sized depending upon the inlet flow and the size of piping used in the system. For example, in a flow system having a maximum of flow rate of 5 gallons per minute it would be necessary that the main kill tank 34 have a capacity of at least 5 gallons to insure that under maximum flow conditions the treated water would be held in the main kill tank 34 for at least one minute.

From kill tank 34, the solution passes through conduit 38 into the mesh and carbon filter 40 where the halogen, for example iodine, is removed along with dangerous chemicals and other pollution causing products. Filter 40 may include a one-micron or other sized, as required carbon-mesh filter that removes particles and other impurities from the fluid. Thus, purified, fresh tasting water exits from the outlet 42 for human consumption.

Filter 40 may be located away from the unit, at or near the point of consumption, to minimize water standing in a pipe without residual halogen between outlet 42 and a dispensing faucet.

Test tap 36 is provided for the purpose of allowing water samples to be removed and tested for purity, halogen parts per million and other tests.

As shown in the schematic flow diagram of FIG. 2, the system consists of a parallel flow branch in series with a main kill tank 34 and filter 40. Incoming fluid flows through one-way check valve 12 and is diverted into a pair of parallel conduits 16, 18. The fluid in branch 16 flows through the injector 20 and from there into the flash-mix tank 32. Valve 28 is provided to allow for manual adjustment of the fluid flow rate through injector 20. Valve 30 controls fluid flow rate in conduit 18. By adjusting valves 28, 30 as required by: the incoming fluid flow rate, impurities in the water and rate of comsumption of the water, a suitable proportioning of flow through conduits 16 and 18 can be provided. Fluid samples may be taken through the sampling valve 36 in order that testing of the fluid may be performed to determine the level of halogen parts per million.

The foregoing description and drawings merely explain and illustrate the invention and the invention is not limited thereto, except insofar as the appended claims are so limited, as those who are skilled in the art and have the disclosure before them will be able to make modifications and variations therein without departing from the scope of the invention.

What is claimed is:

1. A filtering and purifying apparatus for water flowing in a man-made system and adapted for human consumption, the improvement comprising:
   said system having flowing water and means for introducing the flowing water into the purifying apparatus;
   inlet means with means for conducting the flowing water into said purifying apparatus;
   a first conduit and a second conduit, each adapted to branch off from said inlet means and conduct said flowing water;
   injector means providing a container for water;
   means connecting the injector means with the first conduit;
   said injector means including a water purifying agent comprising an iodine halogen within the injector means and for combining with said water and providing a highly treated water;
   third conduit means for carrying said highly treated water from the injector means;
   flash mixing tank means with means connected to the second and third conduits for receiving both highly treated water from the injector means and for receiving untreated water from the second conduit;
   a main kill tank providing a water-tight, portable receptacle and having a volume for storing flowing water for a time in the order of at least one minute to thereby allow the water purifying agent to remain in solution to purify the flowing water;
   filter means;
   means operatively connecting the filter means with the mixing means for transporting the stored, treated water to the filter means;
   said filter means having means for removing particulate matter from said flowing water and also having means for removing at least a major portion of said iodine from said flowing water.

2. The purifying apparatus of claim 1 wherein the container of said injector means includes:
   a top portion and a bottom portion;
   a jet inlet pipe with means located at the bottom of said container;
   means connecting the jet inlet pipe with said first conduit;
   said jet inlet pipe including an elongated hollow tube portion extending across at least a portion of the bottom of the container and having a plurality of openings contained therein for feeding untreated water into said tank for exposure of water from said first conduit with the purifying agent.

3. The purifying apparatus of claim 1 and:
   a control valve;
   said control valve having means mounted adjacent the injector means for controlling the flow of treated water through the first and third conduits and into the flash mix means.

4. The method of purifying a flowing water in a system for human consumption comprising the steps of:
   feeding said water through an inlet conduit;
   diverting said water into a first and a second conduit means,
   combining the water of the first conduit means with iodine to provide a highly treated water;
   flowing the highly treated water through a third conduit;
   controlling flow of said highly treated water through the third conduit with a first valve means;
   controlling flow of water through said second conduit means with a second valve means;
   mixing untreated water from said second conduit means with highly treated water from the third conduit;
   storing said mixed water for a time period in the order of a minimum of one minute and providing a treated water;
   filtering said treated water;
   substantially removing the halogen from the water; and,
   dispensing purified water.

5. The method of purifying flowing water of claim 4 and:
   flowing said water, after mixing highly treated and untreated water into a first, flash mixing tank and then to a larger, main kill storage container for at least one minute.

* * * * *